(12) United States Patent  
Castelli

(10) Patent No.: US 10,933,775 B2  
(45) Date of Patent: Mar. 2, 2021

(54) ADJUSTABLE SEAT FOR SPORTS CARS

(71) Applicant: SABELT S.p.A., Turin (IT)

(72) Inventor: Pier Guido Castelli, Pecetto Torinese (IT)

(73) Assignee: SABELT S.P.A.

(*) Notice: Subject to any disclaimer, the term of this patent is extended or adjusted under 35 U.S.C. 154(b) by 0 days.

(21) Appl. No.: 16/156,491

(22) Filed: Oct. 10, 2018

(65) Prior Publication Data

US 2019/0111808 A1 Apr. 18, 2019

(30) Foreign Application Priority Data

Oct. 13, 2017 (IT) .................. 102017000115553

(51) Int. Cl.
- B60N 2/16 (2006.01)
- B60N 2/12 (2006.01)
- B60N 2/30 (2006.01)

(52) U.S. Cl.
CPC ............ B60N 2/1615 (2013.01); B60N 2/12 (2013.01); B60N 2/1695 (2013.01); B60N 2/3065 (2013.01)

(58) Field of Classification Search
CPC .. B60N 2/1615; B60N 2/1695; B60N 2/3065; B60N 2/309; B60N 2/045; B60N 2/12
USPC ............ 297/344.15, 259.3, 322, 329, 344.11
See application file for complete search history.

(56) References Cited

U.S. PATENT DOCUMENTS

| | | | | |
|---|---|---|---|---|
| 2,809,689 A | * | 10/1957 | Garvey | B60N 2/045 297/341 |
| 3,022,035 A | * | 2/1962 | Pickles | B60N 2/045 248/395 |
| 5,427,433 A | * | 6/1995 | Holobaugh, Jr. | A47C 3/0255 248/370 |
| 5,437,494 A | * | 8/1995 | Beauvais | B60N 2/4214 297/216.1 |
| 5,588,707 A | * | 12/1996 | Bolsworth | B60N 2/3013 296/66 |
| 6,957,796 B2 | * | 10/2005 | Hensley | B60N 2/06 248/421 |
| 2005/0057082 A1 | | 3/2005 | Hatta | |
| 2006/0097538 A1 | | 5/2006 | Villeminey | |
| 2013/0147224 A1 | | 6/2013 | Kim | |

FOREIGN PATENT DOCUMENTS

| | | | | |
|---|---|---|---|---|
| FR | 1453002 A1 | | 2/1966 | |
| GB | 854146 A | * | 11/1960 | ............. B60N 2/045 |
| WO | WO-2005049368 A1 | * | 6/2005 | ........... B60N 2/3065 |
| WO | WO-2012042923 A1 | * | 4/2012 | ........... B60N 2/1615 |

OTHER PUBLICATIONS

Italian Search Report, Italian Patent Application No. 201700115553, dated Jun. 8, 2018.

* cited by examiner

Primary Examiner — Milton Nelson, Jr.

(74) Attorney, Agent, or Firm — Valauskas Corder LLC

(57) ABSTRACT

On each of the two longitudinal sides of the cushion (2) of a seat (1) there is provided a front mechanism (4) and a rear lever (5) to move the seat, varying the height and inclination thereof. The rear lever (5) is hinged to the cushion (2) and to a rear supporting bracket (7). The hinging axis (a1) between the rear lever (5) and the cushion (2), is located at a lower position than the horizontal hinging axis (a2) between the rear lever (5) and the rear supporting bracket (7).

19 Claims, 5 Drawing Sheets

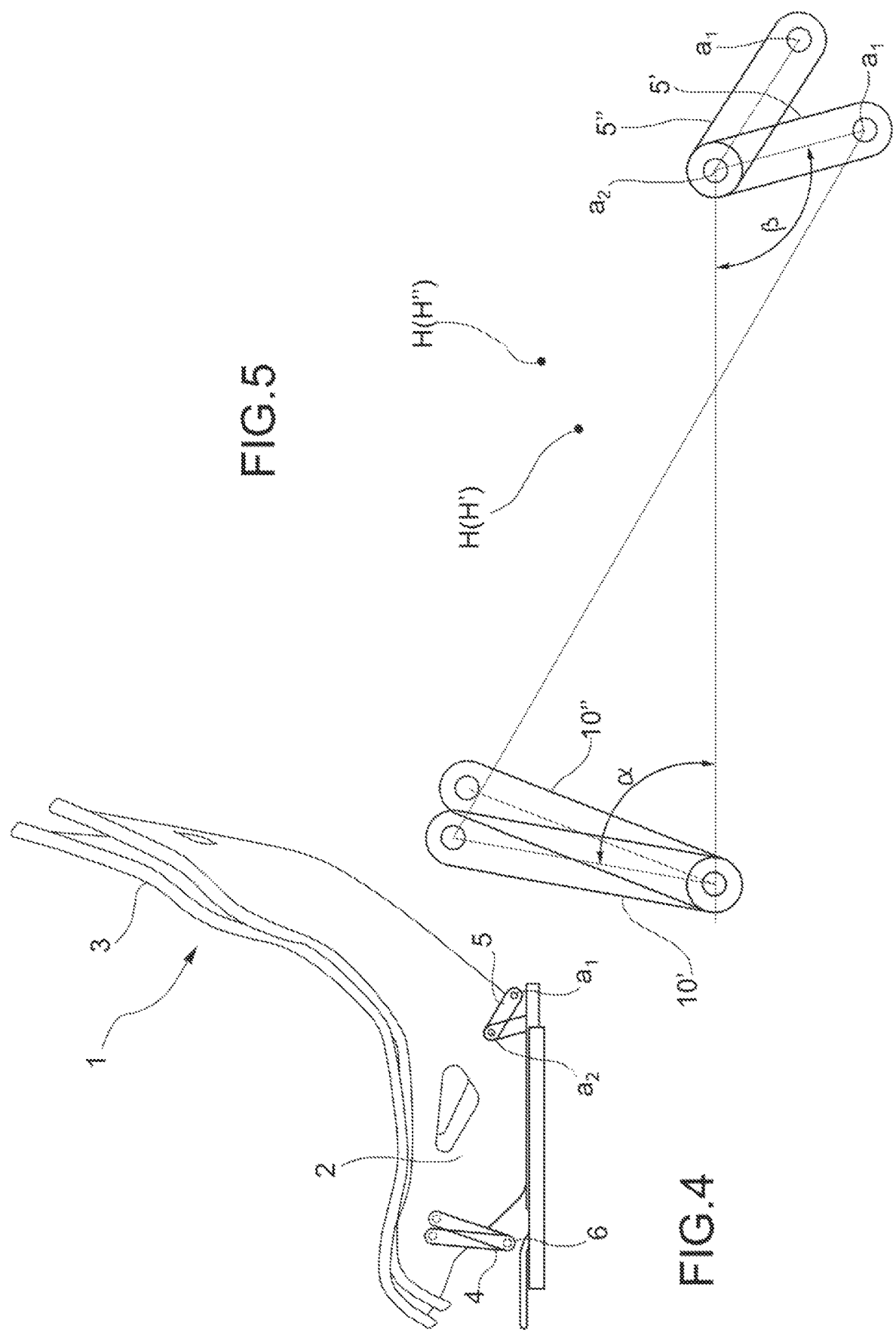

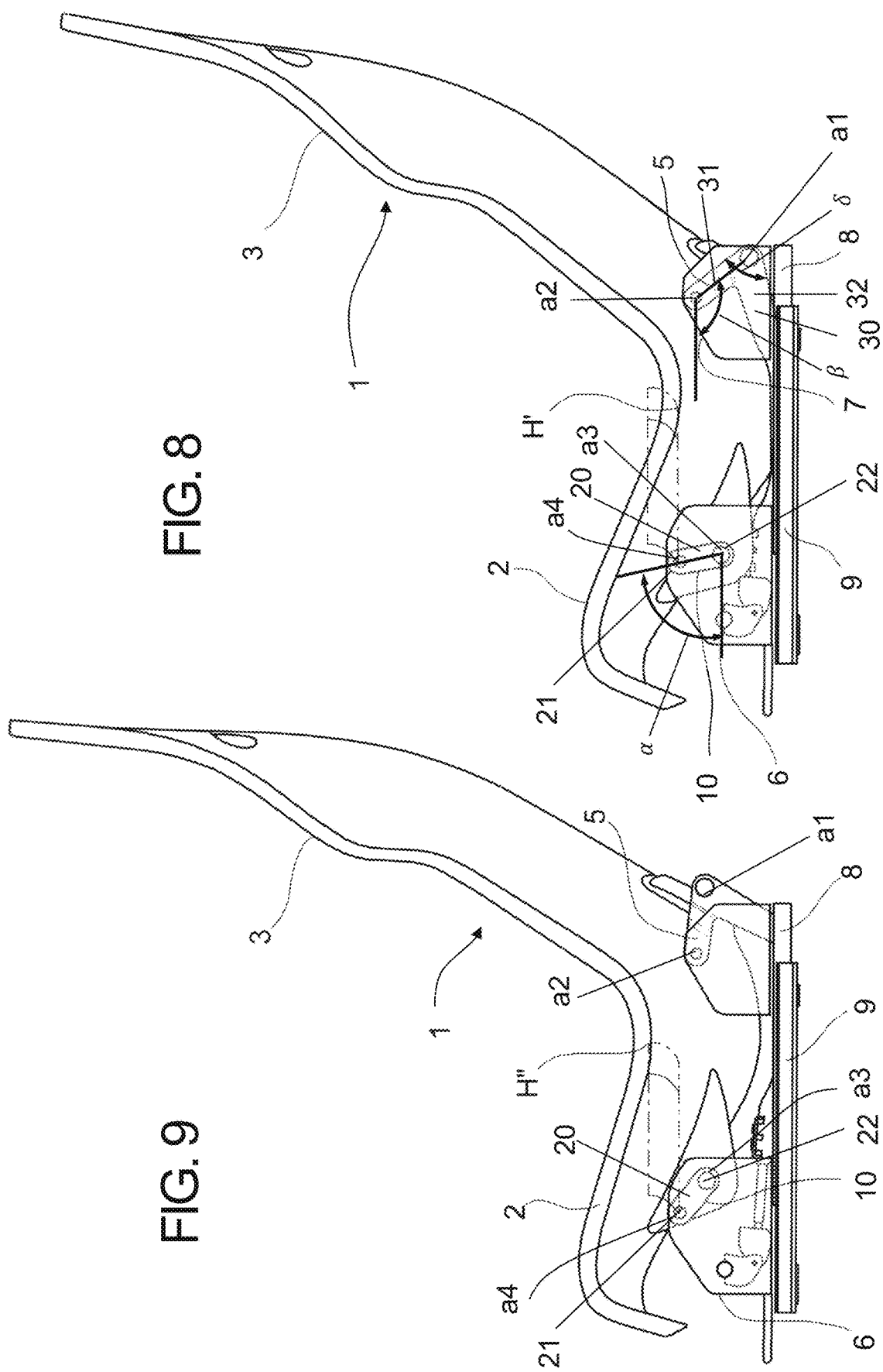

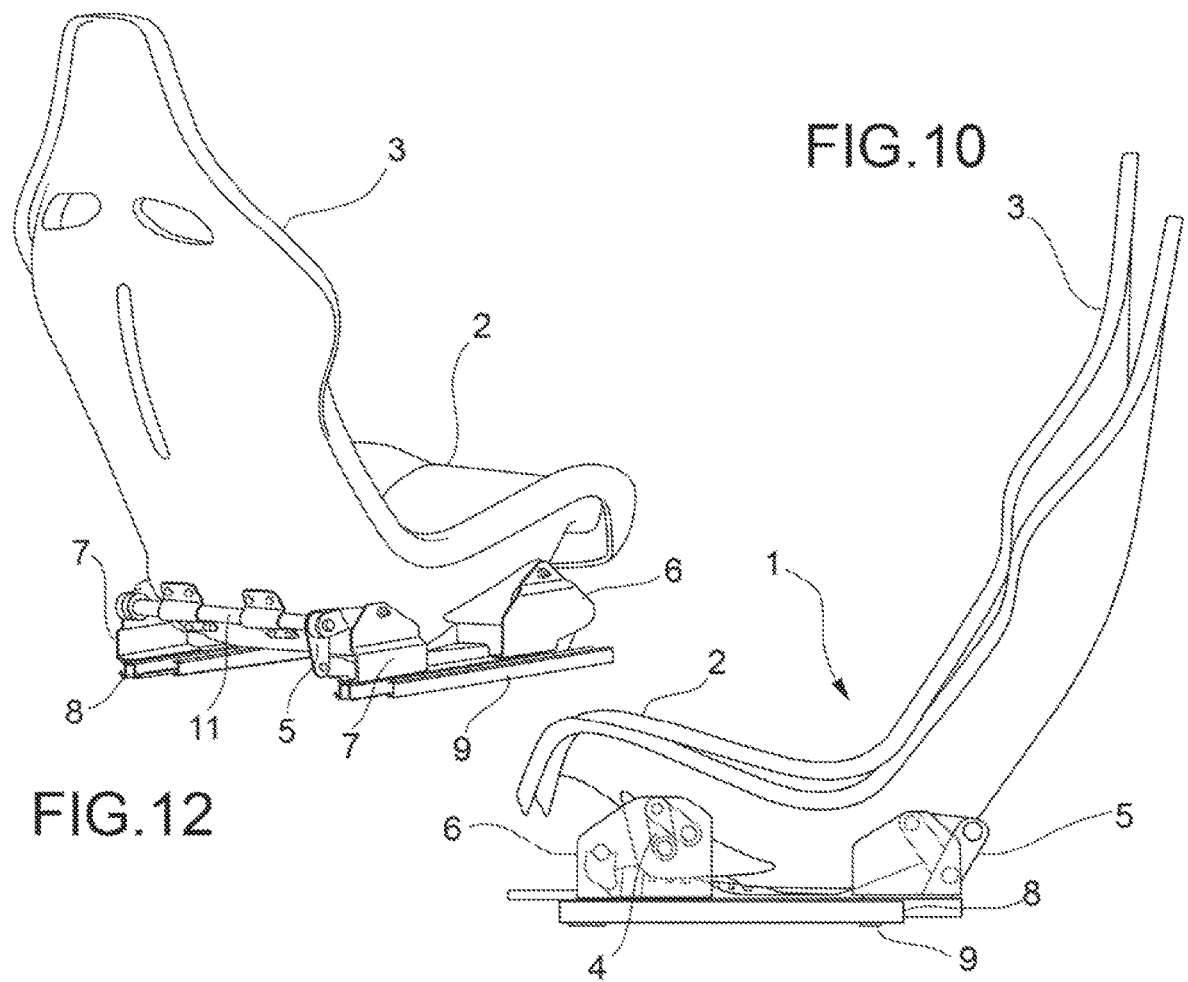
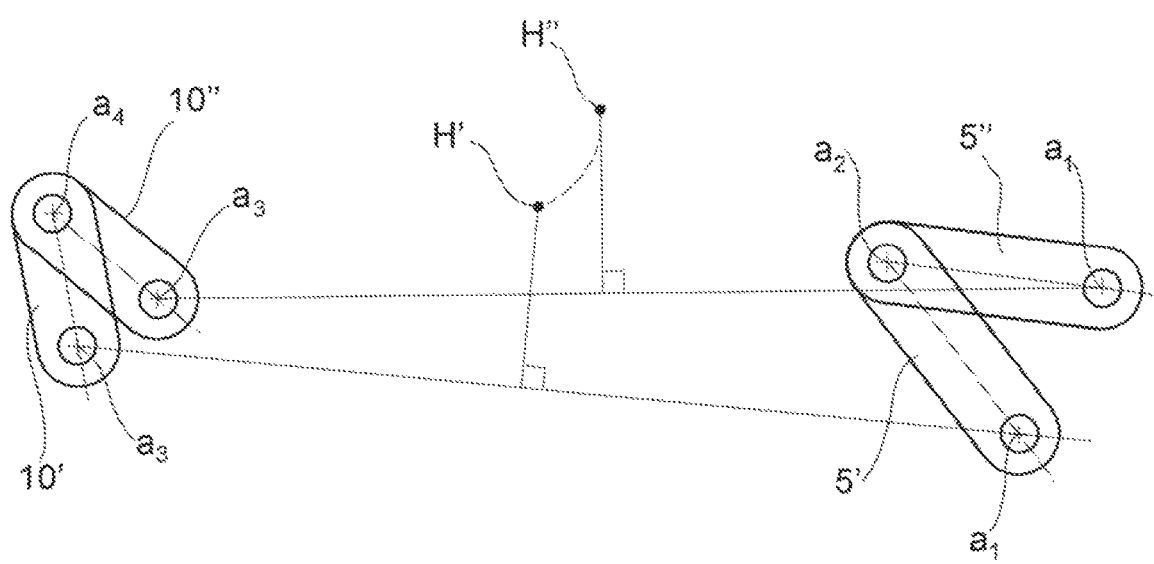

ADJUSTABLE SEAT FOR SPORTS CARS

TECHNICAL FIELD

The present invention relates to an adjustable seat for sports cars, particularly but not exclusively to a seat with a one-piece structure.

BACKGROUND ART

For a better understanding of the prior art and of the problems related to it, two adjustable seats of known type will first be described, illustrated in FIGS. 1 and 2 of the accompanying drawings.

In FIG. 1, a traditional seat-lifting mechanism is provided, on each of the longitudinal sides (left and right) of the cushion 2 of a seat, with a front lever and a rear lever. The two levers connect the seat cushion to a pair of support brackets 6, 7, according to an articulated quadrilateral pattern. The levers are adjustable in different angular positions, in which they are inclined upwards and backwards; the front levers are generally more inclined than the rear levers. This configuration allows varying the height of the seat, but does not offer the possibility of significantly varying the inclination of the seat in a longitudinal vertical plane.

A second and more recent configuration, shown in FIG. 2, provides a front lever 10 and a rear lever 5 on each of the opposite longitudinal sides of the cushion 2 of a seat. Both levers have upper ends hinged to the seat cushion, and lower ends hinged to respective supporting brackets, according to an articulated quadrilateral pattern. On each side, the rear lever is shorter than the front lever. The articulated quadrilateral allows the seat to be moved by making the so-called point "H" perform a movement (FIG. 3) between two opposite positions: a first, more advanced and lower position (H'), and a second, more retracted and higher position (H").

In the first position (or advanced position), the front lever is oriented posteriorly and upwards, forming an angle α of slightly less than 90° with respect to a horizontal line. The rear lever is oriented upwards but at the front and, in the aforementioned first position, it forms a narrower angle with the horizontal, of about 30°.

The configuration shown in FIG. 2 offers an adjustment of both the inclination and the height of the seat. With the configuration in FIG. 2, the application of a vertical load (the weight of the pilot) applied in point H and directed downwards, and even more a horizontal load (for example in braking conditions) generates a forward thrust which may generate instability. Due to possible clearances and structural failure, there is the risk that the front lever will swing forward, passing beyond the vertical. In this case, the seat remains locked forward.

SUMMARY OF THE INVENTION

The object of the present invention is to provide an adjustable seat for sports cars, tackling the problem of avoiding instability and locking of the seat as discussed above, while ensuring a wide adjustment possibility both of the height and of the inclination of the seat cushion; at the same time, it is desired to optimize and reduce the weight of some seat components. Furthermore, it is desired to significantly reduce the driving force required for moving the seat.

These and other objects and advantages, which will be better understood hereinafter, are achieved, according to the present invention, by an adjustable seat having the features set forth in claim 1. Preferred embodiments are defined in the dependent claims.

In summary, on each of the two longitudinal sides of the seat cushion there is provided a front mechanism and a rear lever to move the seat, varying the height and inclination thereof. The rear lever is hinged to the cushion and to a rear supporting bracket. The horizontal hinging axis between the rear lever and the cushion is located at a lower position with respect to the horizontal hinging axis between the rear lever and the rear supporting bracket.

BRIEF DESCRIPTION OF THE DRAWINGS

The features and advantages of the seat according to the present invention will appear more clearly from the following description, made by way an indicative and non-limiting example. Reference will be made to the accompanying drawings, in which:

FIG. 4 is a lateral view of an adjustable seat according to a first embodiment of the present invention, in two positions;

FIG. 5 is a schematic view, on an enlarged scale, of the adjustment mechanisms of the seat in FIG. 4;

FIGS. 8 and 9 are lateral views of a seat according to another embodiment of the invention, shown in two positions;

FIG. 10 is a lateral view of the adjustable seat in FIGS. 8 and 9, in two positions;

FIG. 11 is a schematic view, on an enlarged scale, of the adjustment mechanisms of the seat in FIGS. 8-10;

FIG. 12 is a perspective view of the seat according to FIGS. 8-11; and

DETAILED DESCRIPTION

Figure 1:
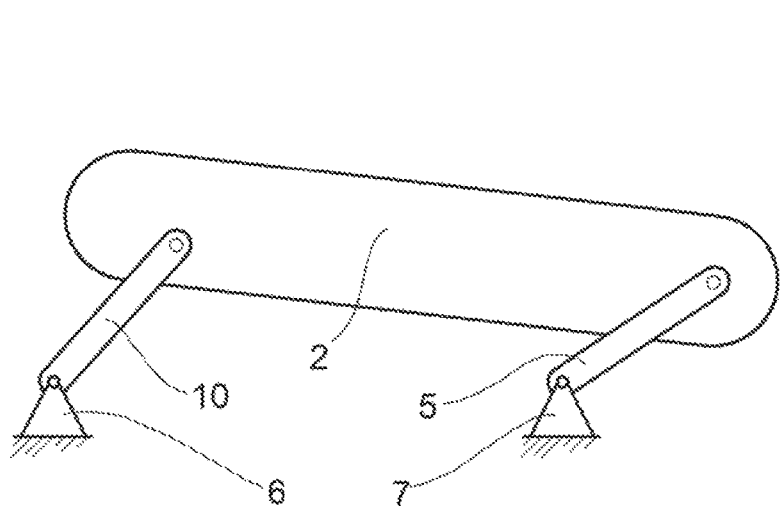
FIG. 1 is a schematic lateral view of a first type of known seat.

With reference to FIGS. 4 and 5, reference numeral 1 generally indicates a seat, which may be accommodated in the passenger compartment of a vehicle, in particular a sports car. The seat 1 comprises a cushion or seat 2 and a backrest 3. In the example shown herein, the cushion 2 and the back 3 are part of a single one-piece structure. According to other embodiments (not illustrated), the cushion and the backrest may be made of two distinct bodies, which are jointed together in an adjustable manner, in particular for adjusting the inclination of the backrest with respect to the cushion.

The cushion 2 has two opposite longitudinal sides, only one of which, the left one, is visible in FIG. 4. Throughout the present description and in the claims, the terms and expressions indicating positions and orientations refer to the condition installed on a motor vehicle. Thus, terms such as "longitudinal", "front" and "rear" are to be referred to the direction of travel of the vehicle. "Lateral" indicates a side parallel to the longitudinal direction of travel.

On each longitudinal side of the cushion a front mechanism 4 and a rear lever 5 are provided. The front mechanism 4 serves for connecting a front portion of the lower seat portion to a front supporting bracket 6. The rear lever 5 is hinged to a rear portion of the cushion 2 about a first horizontal hinging axis a1. The rear lever 5 is also hinged to a rear supporting bracket 7 about a second horizontal hinging axis a2.

The first horizontal hinging axis a1 between the rear lever 5 and the cushion 2 is located at a lower position than the second horizontal hinging axis a2 between the rear lever 5 and the rear supporting bracket 7. Due to this configuration, the rear lever 5 is subject, in use, to a tensile stress and can be advantageously lighter than a traditional lever designed to work on compression which must be sized to work without inflecting due to buckling.

Figure 6:
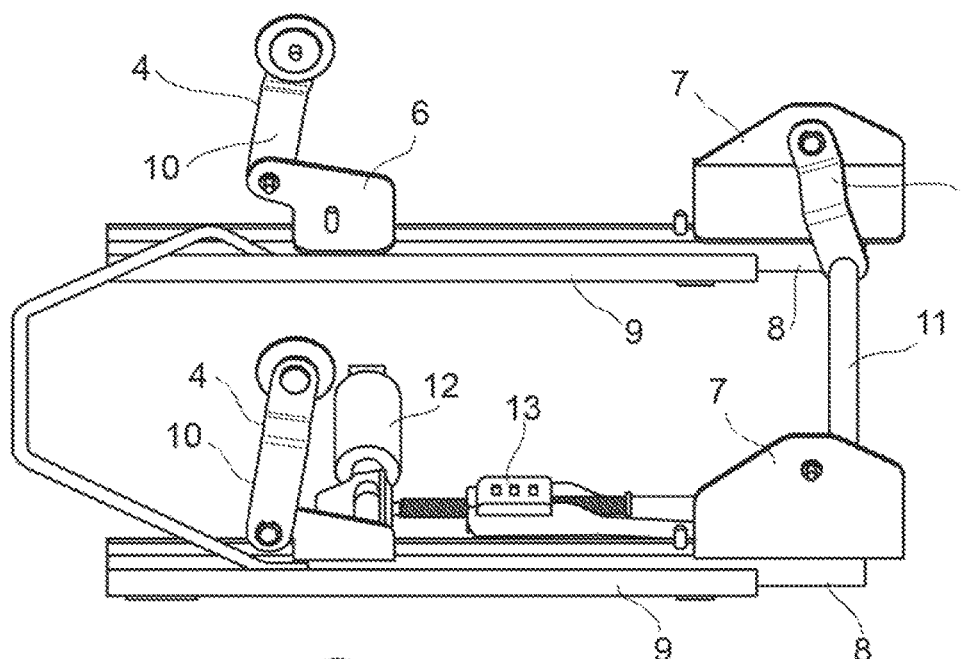
FIGS. 6 and 7 are schematic perspective views of the mechanisms of the seat in FIG. 4, shown in two opposite operative positions.
Figure 7:
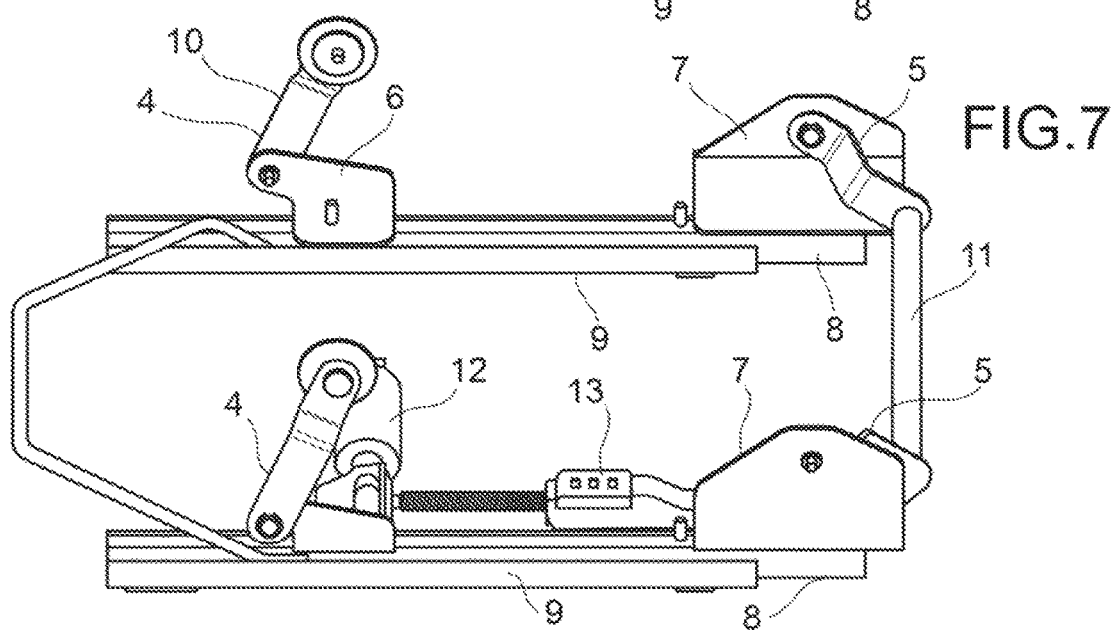

The supporting brackets 6, 7 may be connected to the platform (not shown) of the vehicle in a rigid manner or, as indicated in FIGS. 6 and 7, to slides 8 adjustably sliding along a pair of longitudinal rails or guides 9, so as to adjust the longitudinal position of the seat.

According to an embodiment, as illustrated for example in FIGS. 4 and 5, each front mechanism 4 may comprise a front lever 10. The front lever 10 may have a lower end hinged to the front supporting bracket 6, and an upper end of the same lever 10 hinged to a front lateral portion of the cushion 2.

In the embodiment shown in FIGS. 4 and 5, the rear lever 5 is shorter than the front lever 10.

According to the embodiment in FIGS. 4 and 5, on each side of the seat an articulated quadrilateral is formed, consisting of the front and rear levers 10, the cushion 2 and the front and rear supporting brackets 7. The articulated quadrilateral allows the seat to be moved by making the so-called point "H" perform a movement between two opposite positions: a first, more advanced and lower position H', and a second, more retracted and higher position H".

Figure 2:
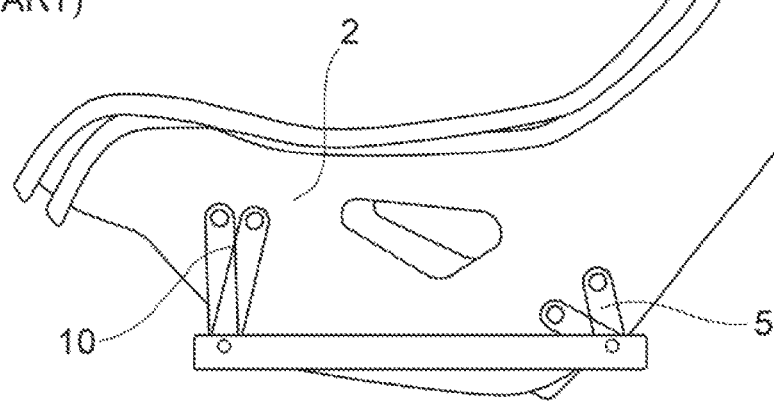
FIG. 2 is a lateral view of a second type of known seat, shown in two positions.
Figure 3:
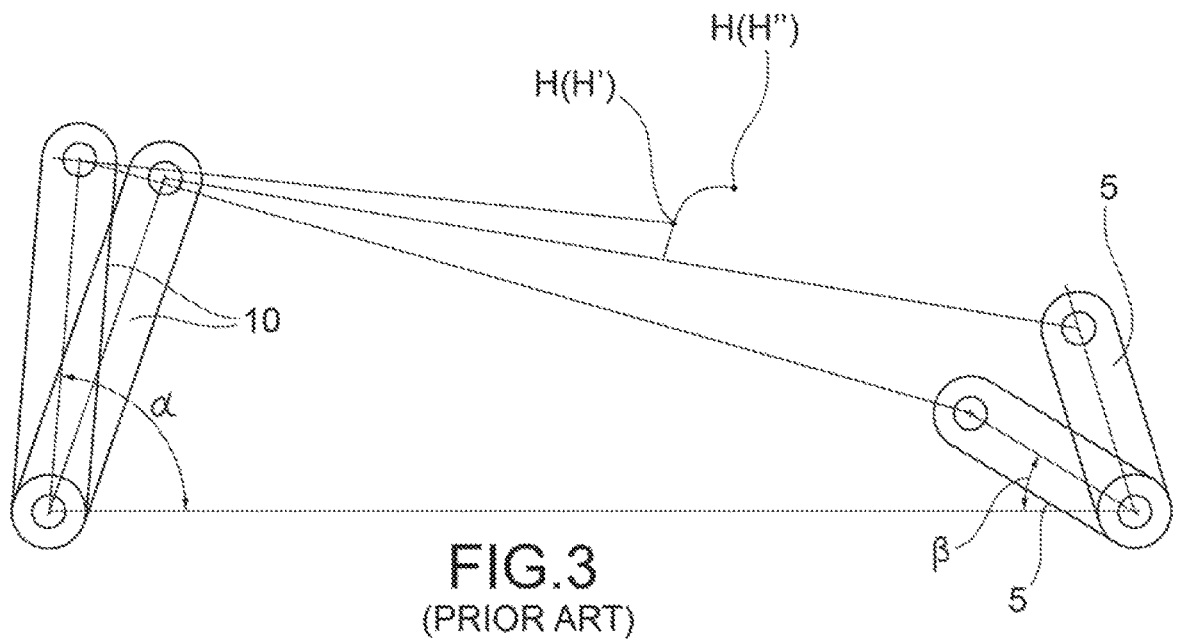
FIG. 3 is a schematic view, on an enlarged scale, of the adjustment mechanisms of the seat in FIG. 2.

The configuration illustrated in FIGS. 4 and 5 allows obtaining a considerable variation of the point H both vertically and longitudinally, with an excursion comparable to that obtainable by the known system described in the introduction with reference to FIG. 2.

According to an embodiment, in both of the two opposite positions obtainable, the rear lever 5 is oriented rearwardly and downwards (FIG. 5).

In one embodiment, in both of the two opposite positions obtainable, the front lever 10 is oriented rearwardly and upwards (FIG. 5).

According to a preferred embodiment, in the first position (or advanced position), indicated with ('), the front lever 10 is oriented posteriorly and upwards, forming an angle $\alpha$ of about 80° with respect to a horizontal line.

In the embodiment shown in FIG. 4, in the first position (or advanced position), indicated with ('), the rear lever 5 is oriented rearwards and downwards, forming an angle of about 105° with respect to a horizontal line. In FIG. 4, the second position of the levers 5 and 10 is indicated with (").

Advantageously, the angle $\alpha$ formed by the front lever 10 in the first position (FIG. 4) may be significantly reduced with respect to the prior art. In other words, the maximum inclination of the front lever 10, in the aforementioned first position, may be kept relatively far from reaching inclination values close to 90°. Therefore, the risk that the front lever 10 may be subjected to a situation of instability, as discussed in the introduction, is prevented.

Moreover, the configuration illustrated in FIGS. 4 and 5 allows the seat to also perform a tilting movement with considerable variation of the angle of the cushion 2 in a longitudinal vertical plane. In the case of a seat with a one-piece structure, the backrest 3 also moves rigidly together with the cushion 2. With one-piece seats, as known, the more laid back position corresponds to an elevation at the front of the seat and vice versa, the less laid back position of the backrest and higher point "H" corresponds to a lowering of the front part of the seat, which also allows adjusting the distance of the most forward part of the seat from the pedals, according to the height of the pilot.

According to an embodiment (FIGS. 6 and 7), the two rear levers 5, left and right, may be connected to each other by means of a tube or bar or other transversal connecting element 11. The transversal connecting element 11 transmits to the right rear lever the adjustment movement imparted to the left rear lever, in this example by a drive 12. It may be appreciated that the transversal connecting element 11 extends outside the seat (FIG. 12). This configuration allows producing a less rigid cushion, since the cushion in this case does not have the task of transmitting the adjustment movement from the (left) drive side to the (right) side without drive. Otherwise, in the absence of a connecting element between the left and right rear levers, the cushion should be structured in such a way as to transmit, without appreciably twisting, the drive movements from the drive side to the opposite side.

FIGS. 6 and 7 show a motor drive 12 with a linear actuator 13 connected to the left rear lever 5. Such a linear actuator may be positioned in front of or behind the rear lever and connected to the brackets 6 or 7 or connected to the cushion structure. According to other embodiments (not shown), the controls for adjusting the seat may be imparted by different means, for example manually by means of a knob, or by other mechanisms known in the art.

In the example shown in FIGS. 6 and 7, the rear lever has an (optional) angled shape to provide a different point of engagement of the rear lever 5 with the actuator 13. However, the rear lever may be made in various other shapes, typically as a linear lever (FIGS. 4 and 5).

According to a particularly advantageous embodiment in terms of excursion of the point "H", also the front mechanism 4 comprises a front lever 10 connected to the cushion and to the relative front supporting bracket 6 similarly to the rear lever 5.

With reference to FIGS. 8 to 12, the front mechanism 4 may comprise a front lever 10 hinged to the front supporting bracket 6 and the lower seat portion 2, whereby on each longitudinal side of the seat a corresponding articulated quadrilateral is formed, consisting of the front and rear 5 levers, the lower seat portion 2 and front 6 and rear supporting brackets 7. The articulated quadrilateral allows the seat to be moved by making a point (H) thereof perform a movement between two opposite positions: a first, more advanced and lower position (H', FIG. 8), and a second, more retracted and higher position (H", FIG. 9). The front lever 10 comprises a linear body 20 between an upper end 21 and a lower end 22. The upper end 21 is hinged to the front supporting bracket 6, and the lower end 22 is hinged to a front lateral portion of the cushion 2. In the first position, (or advanced position) shown in FIG. 8, the body 20 of front lever 10 is oriented anteriorly and upwards from axis a3 forming an angle $\alpha$ of about 80° with respect to a horizontal line. The rear lever 5 comprises a L-shaped body 30 with a first portion 31 and a second portion 32 connected together and forming an angle $\delta$ less than 90 degrees. The rear lever 5 is hinged to bracket 7 and to a rear portion of cushion 2. In the first position, (or advanced position) shown in FIG. 8, the first portion 31 of rear lever 5 is oriented posteriorly and downwards from axis a2 forming an angle $\beta$ of about 105° with respect to a horizontal line. The brackets 6, 7 may be a fixed bracket or a bracket integral with the movable longitudinal guides.

In the example in FIGS. 8 to 12, the front lever 10 is hinged to a front portion of the cushion 2 about a third horizontal hinging axis a3. Moreover, the front lever 10 is also hinged to a respective front supporting bracket 6 about a fourth horizontal hinging axis a4. In both positions as shown in FIGS. 8 and 9, the third horizontal hinging axis a3 between the front lever 10 and the cushion 2 is located at a lower position than the fourth horizontal hinging axis a4 between the front lever 10 and the relative front supporting bracket 6. The rear lever 5 is hinged to a rear portion of the cushion 2 about a first horizontal hinging axis a1. The rear lever 5 is also hinged to a rear supporting bracket 7 about a second horizontal hinging axis a2. In both positions as shown in FIGS. 8 and 9, the first horizontal hinging axis a1 between the rear lever 5 and the cushion 2 is located at a lower position than the second horizontal hinging axis a2 between the rear lever 5 and the rear supporting bracket 7. Due to this configuration, each of the front lever 10 and rear lever 5 is subject, in use, to a tensile stress and can be advantageously lighter than a lever designed to work on compression, must be sized to work without inflecting due to buckling.

Figure 13:
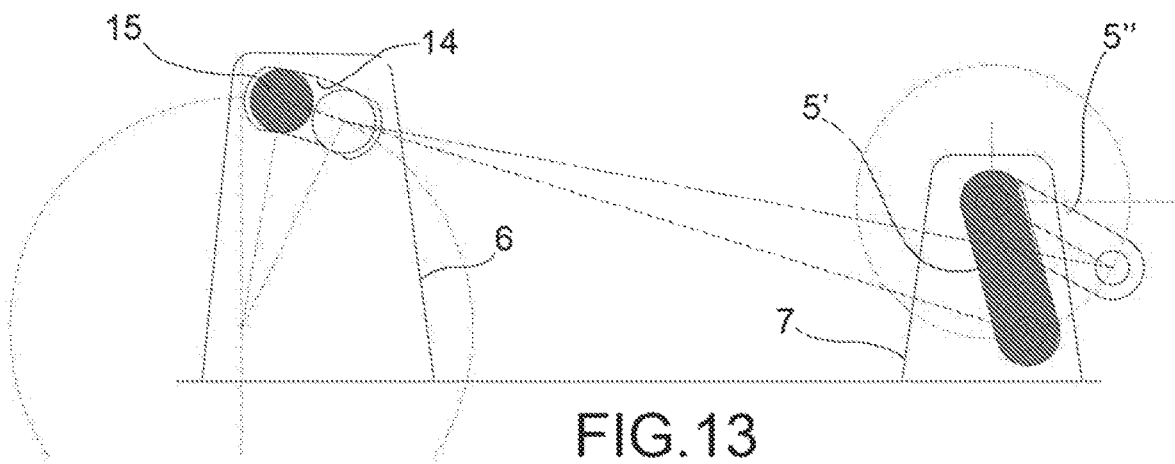
FIG. 13 is a schematic view of a further alternative embodiment of the seat adjustment mechanisms.

According to other embodiments, the anterior mechanism 4 may be different from the lever systems shown in FIGS. 4-7 and 8-12. For example, FIG. 13 illustrates an alternative embodiment, in which each front mechanism comprises a slot 14 which extends in the respective front supporting bracket 6 in a substantially longitudinal and upward direction, preferably according to an arc with concavity facing downwards. The mechanism 4 also comprises a pair of transverse pins 15 which are integral with the cushion and slidingly engaged along the respective slots 14. The configuration may be reversed by making the slots in the seat cushion and the transverse pins in the front supporting brackets 6.

The distribution of the forces, in a seat according to the present invention, allows reducing the driving load required by the knob or the motor. In fact, compared to a traditional configuration, the configuration of the rear lever 5 determines a considerable lever arm between the linear action line of the actuator 13 and the hinging axis a2. Consequently, the force needed to lift the cushion or the one-piece seat is much lower. This also allows the use of a manual as well as an electric actuator. An electric actuator will require reduced power, and may advantageously be small in size, with cost and weight advantages.

Moreover, the reduction of the effort required to lift the seat allows eliminating or at least reducing the torsion bar which in traditional systems serves to "aid" the control system to overcome part of the torque generated by the weight of the seated person to be lifted. Experimental tests carried out by the Applicant have shown that the driving load may be reduced to less than 50% of that required in traditional systems. The system movement speed can also be increased, significantly reducing the drive time to reach the various seat positions.

Various aspects and embodiments of the seat have been described. It is understood that each embodiment may be combined with any other embodiment. The invention, moreover, is not limited to the described embodiments, but may be varied within the scope defined by the appended claims.

The invention claimed is:

1. An adjustable seat for sports cars, the seat comprising a lower seat portion with two opposite longitudinal sides, each longitudinal side being provided with:
    a front mechanism comprising a front lever, the front mechanism for connecting a front portion of the lower seat portion to a front supporting bracket, and
    a rear lever hinged to a rear portion of the lower seat portion about a first horizontal hinging axis, the rear lever being hinged also to a respective rear supporting bracket about a second horizontal hinging axis;
    whereby on each longitudinal side of the seat a corresponding articulated quadrilateral is formed, comprising the front and rear levers, the lower seat portion and the front and rear supporting brackets, the articulated quadrilateral configured to move a point of the seat between two opposite positions: a first, more advanced and lower adjusted position, and a second, more retracted and higher adjusted position, and
    in both the first position and the second position, the first horizontal hinging axis between the rear lever and the lower seat portion is located at a lower position than the second horizontal hinging axis between the rear lever and the rear supporting bracket, whereby each rear lever is subjected to tensile stress, wherein the front lever is hinged to a front lateral portion of the lower seat portion about a third horizontal hinging axis, the front lever being hinged also to the front supporting bracket about a fourth horizontal hinging axis, wherein the third horizontal hinging axis is located at a lower position with respect to the fourth horizontal hinging axis in both the first position and the second position.

2. The adjustable seat of claim 1, wherein the front lever provides:
    a lower end hinged to the front bracket, and
    an upper hinged end to a front lateral portion of the lower seat portion.

3. The adjustable seat of claim 1, wherein the front lever is oriented rearwardly and upwardly.

4. The adjustable seat of claim 1, wherein the front mechanism comprises:
    a pair of slots extending in a substantially longitudinal direction, and
    a pair of transverse pins slidingly engaged along the respective slots,
    wherein either the slots are provided in the front supporting brackets and the transverse pins are integral with the lower seat portion, or the slots are provided by the lower seat portion and the transverse pins are integral with the front supporting brackets.

5. The adjustable seat of claim 1, wherein the rear levers are connected to one another by a transversal connecting element.

6. The adjustable seat of claim 5, wherein the transversal connecting element is in a form of a bar or tube extending externally to the lower seat portion.

7. The adjustable seat of claim 1, comprising the lower seat portion and a backrest which are part of a single, one-piece structure.

8. The adjustable seat of claim 1, wherein the front lever comprises a linear body between an upper end and a lower end, the upper end hinged to the front supporting bracket, and the lower end hinged to a front lateral portion of a cushion.

9. The adjustable seat of claim 8, wherein the body of the front lever is oriented, in the first position, anteriorly and upwards from the third horizontal hinging axis forming an angle α of about 80° with respect to a horizontal line.

10. The adjustable seat of claim 1, wherein the rear lever comprises a L-shaped body with a first portion and a second portion connected together and forming an angle δ less than 90 degrees.

11. The adjustable seat of claim 10, wherein the first portion of rear lever is oriented, in the first position, posteriorly and downwards from the second horizontal hinging axis forming an angle β of about 105° with respect to a horizontal line.

12. An adjustable seat configured to move between a first advanced and low position and a second retracted and high position, the adjustable seat comprising:
- a front lever hinged to a front lateral portion of a lower seat portion about a third horizontal hinging axis, the front lever being hinged also to a front supporting bracket about a fourth horizontal hinging axis;
- a rear lever hinged to a rear portion of the lower seat portion about a first horizontal hinging axis, the rear lever being hinged also to a rear supporting bracket about a second horizontal hinging axis;
- in both the first advanced and low position and the second retracted and high position, the first horizontal hinging axis is located at a lower position than the second horizontal hinging axis and the third horizontal hinging axis is located at a lower position with respect to the fourth horizontal hinging axis.

13. The adjustable seat of claim 12, wherein a transversal connecting element in a form of a bar or a tube connects two rear levers.

14. The adjustable seat of claim 12, wherein the front lever comprises a linear body between an upper end and a lower end, the upper end hinged to the front supporting bracket, and the lower end hinged to a front lateral portion of a cushion.

15. The adjustable seat of claim 12, wherein the front lever is oriented, in the first position, anteriorly and upwards from the third horizontal hinging axis forming an angle α of about 80° with respect to a horizontal line.

16. The adjustable seat of claim 12, wherein the rear lever comprises a L-shaped body with a first portion and a second portion connected together and forming an angle δ less than 90 degrees.

17. The adjustable seat of claim 12, wherein a portion of the rear lever is oriented, in the first position, posteriorly and downwards from the second horizontal hinging axis forming an angle β of about 105° with respect to a horizontal line.

18. An adjustable seat for sports cars, the seat comprising a lower seat portion with two opposite longitudinal sides, each longitudinal side being provided with:
- a front mechanism comprising a front lever, the front mechanism for connecting a front portion of the lower seat portion to a front supporting bracket, and
- a rear lever hinged to a rear portion of the lower seat portion about a first horizontal hinging axis, the rear lever being hinged also to a respective rear supporting bracket about a second horizontal hinging axis;
- whereby on each longitudinal side of the seat a corresponding articulated quadrilateral is formed, comprising the front and rear levers, the lower seat portion and the front and rear supporting brackets, the articulated quadrilateral configured to move a point of the seat between two opposite positions:
  - a first, more advanced and lower adjusted position, and a second, more retracted and higher adjusted position, and
  - in both the first position and the second position, the first horizontal hinging axis between the rear lever and the lower seat portion is located at a lower position than the second horizontal hinging axis between the rear lever and the rear supporting bracket, whereby each rear lever is subjected to tensile stress, wherein the rear levers are connected to one another by a transversal connecting element.

19. An adjustable seat for sports cars, the seat comprising a lower seat portion with two opposite longitudinal sides, each longitudinal side being provided with:
- a front mechanism comprising a front lever, the front mechanism for connecting a front portion of the lower seat portion to a front supporting bracket, and
- a rear lever hinged to a rear portion of the lower seat portion about a first horizontal hinging axis, the rear lever being hinged also to a respective rear supporting bracket about a second horizontal hinging axis;
- whereby on each longitudinal side of the seat a corresponding articulated quadrilateral is formed, comprising the front and rear levers, the lower seat portion and the front and rear supporting brackets, the articulated quadrilateral configured to move a point of the seat between two opposite positions:
  - a first, more advance and lower adjusted position, and a second, more retracted and higher adjusted position, and
  - in both the first position and the second position, the first horizontal hinging axis between the rear lever and lower seat portion is located a lower position than the second horizontal hinging axis between the rear lever and the rear supporting bracket, whereby each rear lever is subjected to tensile stress, wherein the lower seat portion and a backrest are part of a single, one-piece structure.

* * * * *